US012795420B2

(12) United States Patent
Fu

(10) Patent No.: US 12,795,420 B2
(45) Date of Patent: Nov. 10, 2026

(54) METHOD FOR MONITORING OR SENDING PDCCH, AND DEVICE FOR MONITORING PDCCH

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 273 days.

(21) Appl. No.: 18/694,408

(22) PCT Filed: Sep. 22, 2021

(86) PCT No.: PCT/CN2021/119564
§ 371 (c)(1),
(2) Date: Mar. 21, 2024

(87) PCT Pub. No.: WO2023/044602
PCT Pub. Date: Mar. 30, 2023

(65) Prior Publication Data
US 2025/0008356 A1 Jan. 2, 2025

(51) Int. Cl.
*H04W 24/08* (2009.01)
*H04W 72/0446* (2023.01)
*H04W 72/232* (2023.01)

(52) U.S. Cl.
CPC ....... *H04W 24/08* (2013.01); *H04W 72/0446* (2013.01); *H04W 72/232* (2023.01)

(58) Field of Classification Search
None
See application file for complete search history.

(56) References Cited

U.S. PATENT DOCUMENTS

2019/0104510 A1* 4/2019 Lee ........................ H04L 5/0094
2019/0306737 A1 10/2019 Kwak et al.
2020/0329461 A1 10/2020 Yang et al.
2022/0304015 A1* 9/2022 Yi .......................... H04W 24/08
2023/0189305 A1* 6/2023 Oteri ................... H04W 72/232
370/329

(Continued)

FOREIGN PATENT DOCUMENTS

CN 110381568 A 10/2019
CN 110582974 A 12/2019

(Continued)

OTHER PUBLICATIONS

International Search Report of PCT Application No. PCT/CN2021/119564 dated May 30, 2022 with English translation, (4p).

(Continued)

*Primary Examiner* — Diane L Lo
(74) *Attorney, Agent, or Firm* — Arch & Lake LLP; Hao Tan; Shen Wang

(57) ABSTRACT

A method for monitoring or sending PDCCH and a device for monitoring PDCCH are provided. In the method for monitoring PDCCH, a user equipment determines that a PDCCH monitoring capability for use in a connection state is a multi-slot group PDCCH monitoring capability, and monitors the PDCCH using the multi-slot group PDCCH monitoring capability when the user equipment is in the connection state.

18 Claims, 3 Drawing Sheets

(56) References Cited

U.S. PATENT DOCUMENTS

| | | | | |
|---|---|---|---|---|
| 2024/0205928 | A1* | 6/2024 | Bhamri | H04L 5/0053 |

FOREIGN PATENT DOCUMENTS

| | | | |
|---|---|---|---|
| CN | 110913462 | A | 3/2020 |
| CN | 112449760 | A | 3/2021 |
| WO | 2020234932 | A1 | 11/2020 |

OTHER PUBLICATIONS

First Office Action issued to Chinese Patent Application No. 202180002993.4 dated Jul. 16, 2025, with English translation, (25p).

Samsung, "PDCCH monitoring enhancements for NR from 52.6 GHz to 71 GHz" 3GPP TSG RAN WG1 #106, R1-2106874, e-Meeting, Aug. 16-27, 2021, (8p).

Xiaomi, "PDCCH monitoring enhancement for NR 52.6-71 GHz" 3GPP TSG RAN WG1 #107, R1-211563, e-Meeting, Nov. 11-19, 2021, (5p).

Nokia, "PDCCH monitoring enhancements" 3GPP TSG RAN WG1 #106, R1-2107105- e-Meeting, Aug. 16-27, 2021, (6p).

* cited by examiner

METHOD FOR MONITORING OR SENDING PDCCH, AND DEVICE FOR MONITORING PDCCH

CROSS-REFERENCE TO RELATED APPLICATION

The present application is the U.S. National Stage of International Application No. PCT/CN2021/119564 filed on Sep. 22, 2021, the entire contents of which are incorporated herein by reference for all purposes.

BACKGROUND

In the New Radio (NR) protocol, downlink data is carried on physical downlink shared channel (PDSCH) and uplink data is carried on physical uplink shared channel (PUSCH). A base station schedules the PDSCH and PUSCH through downlink control information (DCI) carried on a PDCCH channel.

The PDCCH channel includes a common search space (CSS) and a user equipment specific search space (USS). The CSS is used to carry cell common control information, multicast control information, or the like, and may also be used to carry UE-specific control information, and the USS is used to carry the UE-specific control information.

When a terminal is in a radio resource control (RRC) idle state, it needs to monitor CSS such as Type #0/0-A/1/2. The CSSs may have different slot positions or symbol positions on different beams.

Type #0 CSS is taken as an example.

Time domain positions of Type #0 CSS on different beams are exemplified.

In the case of synchronization signal and PBCH block (SSB) or control resource set (CORSET) multiplexing pattern 1, e.g., in TS 38.213 Table 13-11, the value of index is 4, the total number of SSBs is 8, CORESET 0 is 15 khz SCS, and the length of Coreset 0 is 2 symbols, and the corresponding search space 0 is calculated for SSBs 0 to 7:

- the search space 0 corresponding to SSB 0: symbol 0/1 in slots 5, 6 of even numbered frame SFN (system frame number) 0/2/4/6/8 . . . in the system frame;
- the search space 0 corresponding to SSB 1: symbol 0/1 in slots 6, 7 of even numbered frame SFN 0/2/4/6/8 . . . in the system frame;
- the search space 0 corresponding to SSB 2: symbol 0/1 in slots 7, 8 of even numbered frame SFN 0/2/4/6/8 . . . in the system frame;
- the search space 0 corresponding to SSB 3: symbol 0/1 in slots 8, 9 of even numbered frame SFN 0/2/4/6/8 in the system frame;
- the search space 0 corresponding to SSB 4: symbol 0/1 in slot 9 of even numbered frame SFN 0/2/4/6/8 and in slot 0 of odd numbered frame SFN 1/3/5/7/9 . . . in the system frame;
- the search space 0 corresponding to SSB 5: symbol 0/1 in slot 0, 1 of odd numbered frame SFN 1/3/5/7/9 . . . in the system frame;
- the search space 0 corresponding to SSB 6: symbol 0/1 in slots 1, 2 of odd numbered frame SFN 1/3/5/7/9 in the system frame; and
- the search space 0 corresponding to SSB 7: symbol 0/1 in slots 2, 3 of odd numbered frame SFN 1/3/5/7/9 in the system frame.

In the R15 protocol, a PDCCH monitoring capability is defined in terms of a single slot as a time unit. Specifically, the monitoring capability of a UE in each slot is defined according to a difference in a subcarrier spacing (SCS). The monitoring capability of the UE in a slot includes the maximum number of monitoring times in this slot and the maximum number of non-overlapping control channel elements (CCEs) in this slot.

The existing NR protocol is only used for frequencies below 52.6 GHz. In a higher frequency band around 60 GHz, a large subcarrier bandwidth is usually selected to cope with phase noise, e.g., 960 KHz. A large SCS corresponds to a small slot duration. In the case of 960 KHz, the duration of one slot is 0.015625 ms, i.e., 1⁄64 ms. In this case, a terminal may not need to monitor the PDCCH channel in each slot, and thus a multi-slot PDCCH monitoring capability is introduced in 52.6-71 GHz of the NR protocol. That is, the PDCCH monitoring capability is defined in terms of a multi-slot as a time unit.

SUMMARY

The present disclosure relates to the field of wireless communication technology, and in particular provides a method and device for monitoring or sending a physical downlink control channel and a storage medium.

In a first aspect, an embodiment of the present disclosure provides a method for monitoring a physical downlink control channel (PDCCH). The method is performed by a user equipment and includes:

- determining that a PDCCH monitoring capability for use in a connection state is a multi-slot group PDCCH monitoring capability; and
- in response to determining that the user equipment is in the connection state, monitoring the PDCCH using the multi-slot group PDCCH monitoring capability.

In a second aspect, an embodiment of the present disclosure provides a method for sending a physical downlink control channel (PDCCH). The method is performed by a network device and includes:

sending PDCCH monitoring capability configuration information to a user equipment, wherein the PDCCH monitoring capability configuration information is configured to indicate that a PDCCH monitoring capability for use in a connection state is a multi-slot group PDCCH monitoring capability.

In a third aspect, an embodiment of the present disclosure provides a communication device. The communication device may be used to perform steps performed by the network device in the first aspect described above or in any of the possible designs of the first aspect. The network device may implement each of the functions in each of the methods described above by means of a hardware structure, a software module, or a combination form of a hardware structure and a software module.

When the communication device described in the third aspect is implemented by means of a software module, the communication device may comprise a processing module and a transceiving module coupled to each other, wherein the processing module may be configured for the communication device to perform a processing operation, for example, generate information/message to be sent or process a received signal to obtain information/messages, and the transceiving module may be configured to support the communication device to perform communication.

When performing the steps in the above first aspect, the processing module is configured to determine that a physical downlink control channel (PDCCH) monitoring capability for use in a connection state is a multi-slot group PDCCH monitoring capability, and to monitor, in response to determining that the user equipment is in the connection state, PDCCH using the multi-slot group PDCCH monitoring capability, and the transceiving module is configured to receive the PDCCH.

In a fourth aspect, an embodiment of the present disclosure provides a communication device. The communication device may be used to perform steps performed by the user equipment in the second aspect described above or in any of the possible designs of the second aspect. The user equipment may implement each of the functions in each of the methods described above by means of a hardware structure, a software module, or a combination form of a hardware structure and a software module.

When the communication device described in the fourth aspect is implemented by means of a software module, the communication device may comprise a transceiving module coupled to each other, wherein the transceiving module may be configured to support the communication device to perform communication.

When performing the steps in the above second aspect, the transceiving module is configured to send a physical downlink control channel (PDCCH) monitoring capability configuration information to a user equipment, wherein the PDCCH monitoring capability configuration information is configured to indicate that a PDCCH monitoring capability for use in a connection state is a multi-slot group PDCCH monitoring capability.

In a fifth aspect, the present disclosure provides a communication device including a processor and a memory. The memory is configured to store a computer program, and the processor is configured to execute the computer program to implement the first aspect or any possible design thereof.

In a sixth aspect, the present disclosure provides a communication device including a processor and a memory. The memory is configured to store a computer program, and the processor is configured to execute the computer program to implement the second aspect or any possible design thereof.

In a seventh aspect, the present disclosure provides a computer-readable storage medium having instructions (or called computer programs or programs) stored thereon that, when being invoked and executed on a computer, cause the computer to perform the first aspect or any possible design thereof.

In an eighth aspect, the present disclosure provides a computer-readable storage medium having instructions (or called computer programs or programs) stored thereon that, when being invoked and executed on a computer, cause the computer to perform the second aspect or any possible design thereof.

It should be understood that the above general description and the detailed description that follows are exemplary and explanatory only and do not limit the present disclosure.

BRIEF DESCRIPTION OF THE DRAWINGS

The accompanying drawings illustrated herein are used to provide a further understanding of embodiments of the present disclosure and form a part of the present application, and the exemplary embodiments of the present disclosure and their illustrations are used to explain the embodiments of the present disclosure and do not constitute an unproper limitation of the embodiments of the present disclosure.

The accompanying drawings herein, which are incorporated into and form a part of the specification, illustrate embodiments in accordance with the embodiments of the present disclosure and are used in conjunction with the specification to explain the principles of the embodiments of the present disclosure.

DETAILED DESCRIPTION

Figure 1:
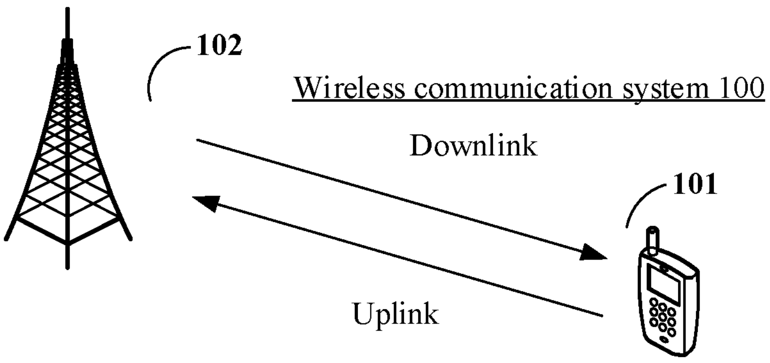
FIG. 1 is a schematic diagram of a wireless communication system architecture according to an embodiment of the present disclosure.

Embodiments of the present disclosure are further described in conjunction with the accompanying drawings and detailed description.

Exemplary embodiments will be described herein in detail, examples of which are represented in the accompanying drawings. When the following description are made with reference to the accompanying drawings, the same reference numerals in the different accompanying drawings indicate the same or similar elements unless otherwise indicated. The implementations described in the following exemplary embodiments do not represent all embodiments consistent with the present disclosure. Rather, they are only examples of devices and methods consistent with some aspects of the present disclosure as detailed in the appended claims.

As shown in FIG. 1, a method for monitoring a PDCCH and a method for sending a PDCCH provided in the embodiments of the present disclosure may be applied to a wireless communication system 100, which may include a user equipment 101 and a network device 102. The user equipment 101 is configured to support carrier aggregation, and the user equipment 101 may be connected to a plurality of carrier units of the network device 102, including a primary carrier unit and one or more secondary carrier units.

It is to be understood that application scenarios of the wireless communication system 100 include, but are not limited to, a long term evolution (LTE) system, an LTE frequency division duplex (FDD) system, an LTE time division duplex (TDD) system, a worldwide interoperability for micro wave access (WiMAX) communication system, a cloud radio access network (CRAN) system, a future 5th-generation (5G) system, new radio (NR) communication system, a future evolved public land mobile network (PLMN) system or the like.

The user equipment 101 (UE) shown above may be a terminal, an access terminal, a terminal unit, a terminal station, a mobile station (MS), a remote station, a remote terminal, a mobile terminal, a wireless communication device, a terminal agent, a terminal device or the like. The user equipment 101 may have a wireless transceiver function, which can communicate (e.g., wirelessly) with one or more network devices 102 of one or more communication systems and receive network services provided by the network devices 102. The network device 102 herein includes, but is not limited to, the network devices 102 as shown.

The user equipment 101 may be a cellular telephone, a cordless telephone, a session initiation protocol (SIP) telephone, a wireless local loop (WLL) station, a personal digital assistant (PDA) device, a handheld device with wireless communication capabilities, a computing device or other processing device connected to a wireless modem, an in-vehicle device, a wearable device, a terminal device in a future 5G network, a terminal device in a future evolved PLMN network, and the like.

The network device 102 may be an access network device (or access network site). The access network device refers to a device having a network access function, such as a radio access network (RAN) base station and the like. The network device 102 may specifically include a base station (BS), or include a base station and a wireless resource management device for controlling the base station, and the like. The network device 102 may further include a relay station (relay device), an access point, and a base station in future 5G network, a base station in future evolved PLMN network, or a NR base station, and the like. The network device 102 may be a wearable device or an in-vehicle device. The network device 102 may also be a communication chip having a communication module.

For example, the network device 102 includes, but is not limited to, a next-generation base station (gnodeB, gNB) in 5G, an evolved node B (eNB) in an LTE system, a radio network controller (RNC), a node B (NB) in a WCDMA system, a wireless controller in a CRAN system, a base station controller (BSC), a base transceiver station (BTS) in a GSM system or a CDMA system, a home base station (e.g., home evolved nodeB, or home node B (HNB)), a baseband unit (BBU), a transmitting and receiving point (TRP), a transmitting point (TP), a mobile switching center or the like.

A multi-slot PDCCH monitoring capability may be defined in the following two manners:

A first manner is a multi-slot group manner based on a fixed mode, which corresponds to a first value X and a second value Y. One multi-slot group fixedly includes X slots, respective multi-slot groups are consecutive and non-overlapped, and Y consecutive slots in each multi-slot group can be used for PDCCH monitoring. The Y slots have the same position in respective multi-slot groups.

A second manner is a span-based manner in which each span corresponds to one multi-slot group, which corresponds to a first value X and a second value Y. X is the minimum interval between two neighbouring spans, the minimum interval being in units of slot. In one span, only Y consecutive slots are available for PDCCH monitoring.

Many CSSs are cell-level configurations, i.e., the time-frequency domain location of the CSS is fixed for all UEs in the cell.

In the case of multi-slot PDCCH monitoring capability, different UEs may have different monitoring capabilities (e.g., different UEs do not have the same X/Y), and it is hard to ensure that all UEs receive the CSS in the Y slots allowed by the monitoring capabilities thereof, for example, it is hard to ensure that the CSS (e.g., Type #0/0-A/1/2) that needs to be monitored before the RRC connection falls within the Y slots corresponding to the monitoring capability of the UE.

Moreover, some CSSs have different positions on different beams, for example, Type #0 CSS has different positions on different beams. If Type #0 CSS can fall within the Y slots of the monitoring capability of the UE on a certain beam, it is hard to ensure that after the UE switches to another beam, Type #0 CSS can also fall within the Y slots of the monitoring capability of this UE on the switched beam.

Figure 2:
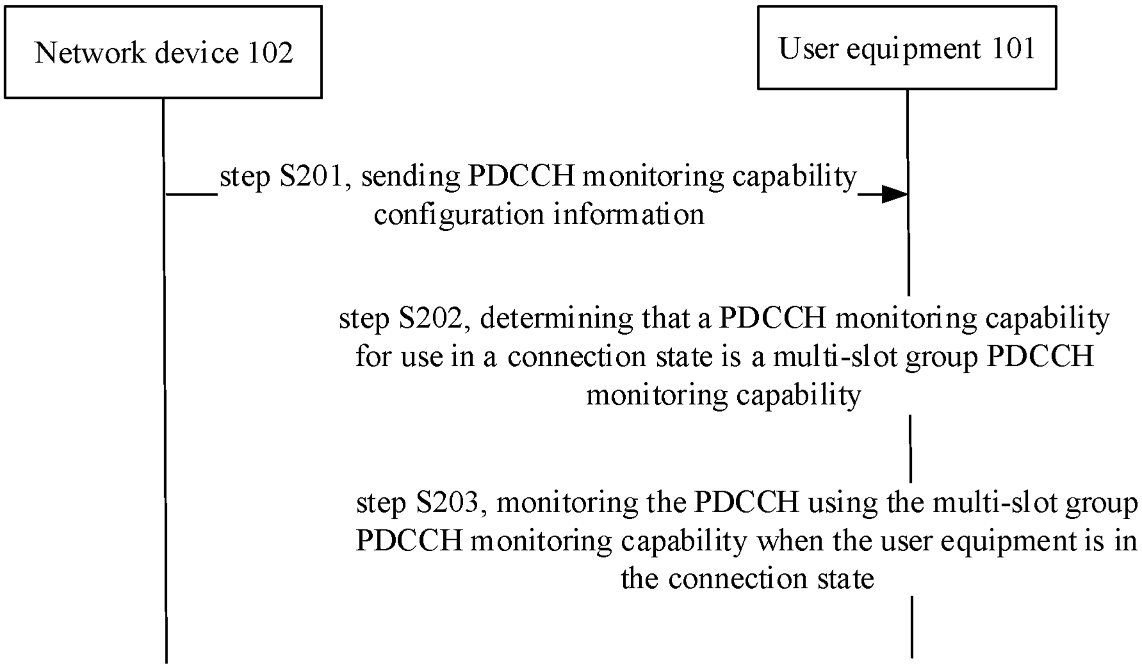
FIG. 2 is a flowchart of a method for monitoring a physical downlink control channel according to an embodiment of the present disclosure.

An embodiment of the present disclosure provides a method for transmitting a PDCCH. Referring to FIG. 2, FIG. 2 is a flowchart of a method for transmitting a PDCCH according to an embodiment. As shown in FIG. 2, the method includes steps S201 to S203.

In step S201, a network device 102 sends physical downlink control channel (PDCCH) monitoring capability configuration information to a user equipment 101, wherein the PDCCH monitoring capability configuration information is configured to indicate that a PDCCH monitoring capability for use in a connection state is a multi-slot group PDCCH monitoring capability.

In step S202, the user equipment 101 determines that the PDCCH monitoring capability for use in the connection state is the multi-slot group PDCCH monitoring capability.

In step S203, the user equipment 101 monitors the PDCCH using the multi-slot group PDCCH monitoring capability when the user equipment is in the connection state.

In a possible implementation, the user equipment 101 being in the connection state may be that the user equipment is in an RRC connection state.

In a possible implementation, the user equipment 101 being in a non-connection state may be that the user equipment is in an RRC idle state (RRC_IDLE) or an RRC inactive state (RRC_INACTIVE). Since the 52.6-71 GHZ band in NR supports a single slot PDCCH monitoring capability by default, the user equipment 101 monitors the PDCCH using the single slot PDCCH monitoring capability when being in the non-connection state, i.e., the user equipment 101 monitors the PDCCH according to the requirements of the single slot PDCCH monitoring capability, which thus is compatible with the NR protocol and ensures the monitoring effect and the correct reception of the CSS when the user equipment 101 is in the non-connection state.

In an embodiment of the present disclosure, after determining that that the PDCCH monitoring capability for use in the connection state is the multi-slot group PDCCH monitoring capability, the user equipment 101 monitors the PDCCH in the connection state using the multi-slot group PDCCH monitoring capability, which, in comparison to monitoring the PDCCH based on a single slot PDCCH monitoring capability in the related art, can effectively save the processing capability of the user equipment 101, and at the same time can guarantee the effect of the PDCCH monitoring. Further, the PDCCH is monitored in the non-connection state using the single slot PDCCH monitoring capability, so that the PDCCH is monitored in different RRC states using respective monitoring capabilities, thereby realizing a flexible configuration of a search space for control information of the user equipment and a reasonable allocation of the processing capability of the user equipment.

An embodiment of the present disclosure provides a method for monitoring a PDCCH. This method is performed by the user equipment 101 and includes:

- step S1-1, determining that a PDCCH monitoring capability for use in a connection state is a multi-slot group PDCCH monitoring capability; and
- step S1-2, monitoring the PDCCH using the multi-slot group PDCCH monitoring capability when the user equipment is in the connection state.

In an implementation, step S1-2 further includes: monitoring the PDCCH using a single slot PDCCH monitoring capability when the user equipment is in a non-connection state.

An embodiment of the present disclosure provides a method of monitoring a PDCCH. The method is performed by the user equipment 101 and includes:

step S2-1, determining, according to a protocol, that a PDCCH monitoring capability for use in a connection state is a multi-slot group PDCCH monitoring capability; and step S2-2, monitoring the PDCCH using the multi-slot group PDCCH monitoring capability when the user equipment is in the connection state.

An embodiment of the present disclosure provides a method for monitoring a PDCCH. The method is performed by the user equipment 101 and includes:

step S3-1, receiving PDCCH monitoring capability configuration information from a network device, wherein the PDCCH monitoring capability configuration information is configured to indicate that a PDCCH monitoring capability for use in a connection state is a multi-slot group PDCCH monitoring capability; and step S3-2, monitoring the PDCCH using the multi-slot group PDCCH monitoring capability when the user equipment is in the connection state.

In a possible implementation, if the user equipment 101 has not received the PDCCH monitoring capability configuration information from the network device, the user equipment 101 monitors the PDCCH using a single slot PDCCH monitoring capability when the user device is in the connection state.

An embodiment of the present disclosure provides a method for monitoring a PDCCH. The method is performed by the user equipment 101 and includes:

step S4-1, sending capability information to a network device, wherein the capability information includes multi-slot group PDCCH monitoring capability; and step S4-2, monitoring the PDCCH using the multi-slot group PDCCH monitoring capability when the user equipment is in a connection state.

In a possible implementation, if the user equipment 101 has not sent the capability information to the network device, the user equipment 101 monitors the PDCCH using a single slot PDCCH monitoring capability when the user device is in the connection state.

An embodiment of the present disclosure provides a method for monitoring a PDCCH. The method is performed by the user equipment 101 and includes:

step S5-1, determining that a PDCCH monitoring capability for use in a connection state is a multi-slot group PDCCH monitoring capability;

step S5-2, sending at least one group of capability parameters corresponding to the multi-slot group PDCCH monitoring capability to a network device; and step S5-3, monitoring the PDCCH using the multi-slot group PDCCH monitoring capability when the user equipment is in a connection state.

In a possible implementation, each of at least N groups among the at least one group of capability parameters includes a first value and a second value, wherein Nis an integer greater than zero. In a possible example, the value of N is 1. In another possible example, each of the at least one group of capability parameters includes a first value and a second value.

In a possible implementation, corresponding to the first manner of defining the multi-slot PDCCH monitoring capability, the first value is configured to denote the number of slots included in each multi-slot group, and the second value is configured to denote the number of slots, for monitoring PDCCH, included in each multi-slot group.

Respective multi-slot groups are consecutive and do not have an overlapping slot, and positions of slots for monitoring the PDCCH in any two different multi-slot groups are the same.

In a possible implementation, corresponding to the first manner of defining the multi-slot PDCCH monitoring capability, the first value is configured to indicate a minimum value of a number of slots between two neighbouring multi-slot groups, and the second value is configured to indicate a number of slots for monitoring the PDCCH included in each multi-slot group.

An embodiment of the present disclosure provides a method for monitoring a PDCCH. The method is performed by the user equipment 101 and includes:

step S6-1, determining that a PDCCH monitoring capability for use in a connection state is a multi-slot group PDCCH monitoring capability;

step S6-2, sending at least one group of capability parameters corresponding to the multi-slot group PDCCH monitoring capability to a network device; and step S6-3, receiving PDCCH monitoring capability configuration information from the network device, wherein the PDCCH monitoring capability configuration information is configured to indicate that the PDCCH monitoring capability for use in the connection state is the multi-slot group PDCCH monitoring capability, and is further configured to indicate a target group of capability parameters, and wherein the target group of capability parameters is a group among the at least one group of capability parameters; and step S6-4, monitoring the PDCCH using the multi-slot group PDCCH monitoring capability when the user equipment is in a connection state.

A maximum of M PDCCH candidates and a maximum of N non-overlapping CCEs corresponding to the multi-slot group PDCCH monitoring capability corresponding to any group of capability parameters are specified in the protocol. When the user equipment 101 monitors the PDCCH using the multi-slot group PDCCH monitoring capability corresponding to any group of capability parameters, it may be not beyond the monitoring capability in the corresponding multi-slot group specified in the protocol.

In an example, the multi-slot group PDCCH monitoring capability of the first manner, or the multi-slot group PDCCH monitoring capability of the second manner, or a multi-slot group PDCCH monitoring capability of a third manner is used by default, wherein the third manner is a combination of the first manner and the second manner.

In step S6-2, the user equipment 101 sends two groups of capability parameters corresponding to the multi-slot group PDCCH monitoring capability it supports. A first group of the two groups of capability parameters is [8,2], i.e., X=8, Y=2, and a second group thereof is [4,1], i.e., X=4, Y=1.

In step S6-3, the PDCCH monitoring capability configuration information is received from the network device 102, and the PDCCH monitoring capability configuration information indicates the multi-slot group PDCCH monitoring capability and the second group of capability parameters, i.e., [4, 1].

The user equipment 101 performs PDCCH monitoring in accordance with the multi-slot group PDCCH monitoring capability corresponding to the second group of capability parameters as specified in the protocol. The protocol specifies a maximum of M PDCCH candidates and a maximum of N non-overlapping CCEs corresponding to the multi-slot group PDCCH monitoring capability corresponding to [8,2], and when the user equipment 101 monitors the PDCCH, it may be not beyond the monitoring capability in the corresponding multi-slot group consisting of 8 slots as specified in the protocol.

In a possible implementation, slots for monitoring the PDCCH corresponding to the target group of capability parameters in step S6-3 meet a first condition.

The first condition includes that a common search space configured within a same multi-slot group and a common search space received by the user equipment in a non-connection state are located in some or all of the slots for monitoring the PDCCH corresponding to the target group of capability parameters of the user equipment.

With the first condition, it may ensure that within the same multi-slot group, the CSS configured by the network device 102 and the CSS already determined by the user equipment 101 in the non-connection state (e.g., the CSS in Type #0/0-A/1/2), both fall within the slots for monitoring the PDCCH required by the PDCCH monitoring capability of the user equipment 101.

An embodiment of the present disclosure provides a method for sending a PDCCH. The method is performed by the network device 102 and includes:

step S7-1, sending PDCCH monitoring capability configuration information to a user equipment, wherein the PDCCH monitoring capability configuration information is configured to indicate that a PDCCH monitoring capability for use in a connection state is a multi-slot group PDCCH monitoring capability.

In an embodiment of the present disclosure, the network device sends the PDCCH monitoring capability configuration information to the user equipment to indicate that the PDCCH monitoring capability for use in the connection state is the multi-slot group PDCCH monitoring capability, so that after determining that the PDCCH monitoring capability for use in the connection state is the multi-slot group PDCCH monitoring capability, the user equipment monitors the PDCCH in the connection state using the multi-slot group PDCCH monitoring capability, and monitors the PDCCH in the non-connection state using the single slot PDCCH monitoring capability, therefore the PDCCH is monitored in different RRC states using respective monitoring capabilities, which can effectively save the processing capability of the user equipment, and at the same time can guarantee the effect of the PDCCH monitoring.

An embodiment of the present disclosure provides a method for sending a PDCCH. The method is performed by the network device 102 and includes:

step S8-1, receiving capability information from a user equipment, wherein the capability information includes a multi-slot group PDCCH monitoring capability; and step S8-1, sending PDCCH monitoring capability configuration information to the user equipment, wherein the PDCCH monitoring capability configuration information is configured to indicate that the PDCCH monitoring capability for use in a connection state is the multi-slot group PDCCH monitoring capability.

An embodiment of the present disclosure provides a method for sending a PDCCH. The method is performed by the network device 102 and includes:

step S9-1, receiving capability information from the user equipment, wherein the capability information comprises a multi-slot group PDCCH monitoring capability;

step S9-2, receiving at least one group of capability parameters corresponding to the multi-slot group PDCCH monitoring capability from the user equipment; and step S9-3, sending PDCCH monitoring capability configuration information to the user equipment, wherein the PDCCH monitoring capability configuration information is configured to indicate that a PDCCH monitoring capability for use in a connection state is the multi-slot group PDCCH monitoring capability.

In a possible implementation, the method further includes:

sending the PDCCH monitoring capability configuration information to the user equipment, wherein the PDCCH monitoring capability configuration information is configured to indicate that the PDCCH monitoring capability for use in the connection state is the multi-slot group PDCCH monitoring capability, and is further configured to indicate a target group of capability parameters, and wherein the target group of capability parameters is a group among the at least one group of capability parameters.

In an example, slots for monitoring the PDCCH corresponding to the target group of capability parameters meet a first condition. The first condition includes that a common search space configured within a same multi-slot group and a common search space received by the user equipment in a non-connection state are located in some or all of the slots for monitoring the PDCCH corresponding to the target group of capability parameters of the user equipment.

Based on the same concept as the above method embodiments, an embodiment of the present disclosure also provides a communication device that may have the function of the network device 102 in the above method embodiments and may be used to perform the steps provided by the above method embodiments that are performed by the network device 102. The function may be implemented by a hardware, or by a software or by a hardware executing a corresponding software. The hardware or software includes one or more modules corresponding to the function described above.

Figure 3:
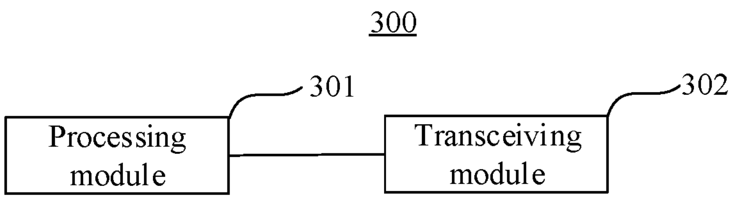
FIG. 3 is a structural diagram of a device for monitoring a physical downlink control channel according to an embodiment of the present disclosure.

In a possible implementation, the communication device 300 as shown in FIG. 3 may be used as the network device 102 involved in the above method embodiments and perform the steps performed by the network device 102 in the above method embodiments. As shown in FIG. 3, the communication device 300 may include a processing module 301 and a transceiving module 302 that are coupled to each other. The processing module 301 may be used for the communication device 300 to perform processing operations including, but not limited to: generating information, messages sent by the transceiving module 302, and/or, demodulating and decoding signals received by the transceiving module 302, and the like. The transceiving module 302 may be used to support the communication of the communication device 300, and the transceiving module 302 may have a wireless communication function, for example, can communicate wirelessly with other communication devices via wireless radio.

When performing the steps implemented by the network device 102, the transceiving module 302 is used to send PDCCH monitoring capability configuration information to a user equipment, wherein the PDCCH monitoring capability configuration information is configured to indicate that a PDCCH monitoring capability for use in a connection state is a multi-slot group PDCCH monitoring capability.

Figure 4:
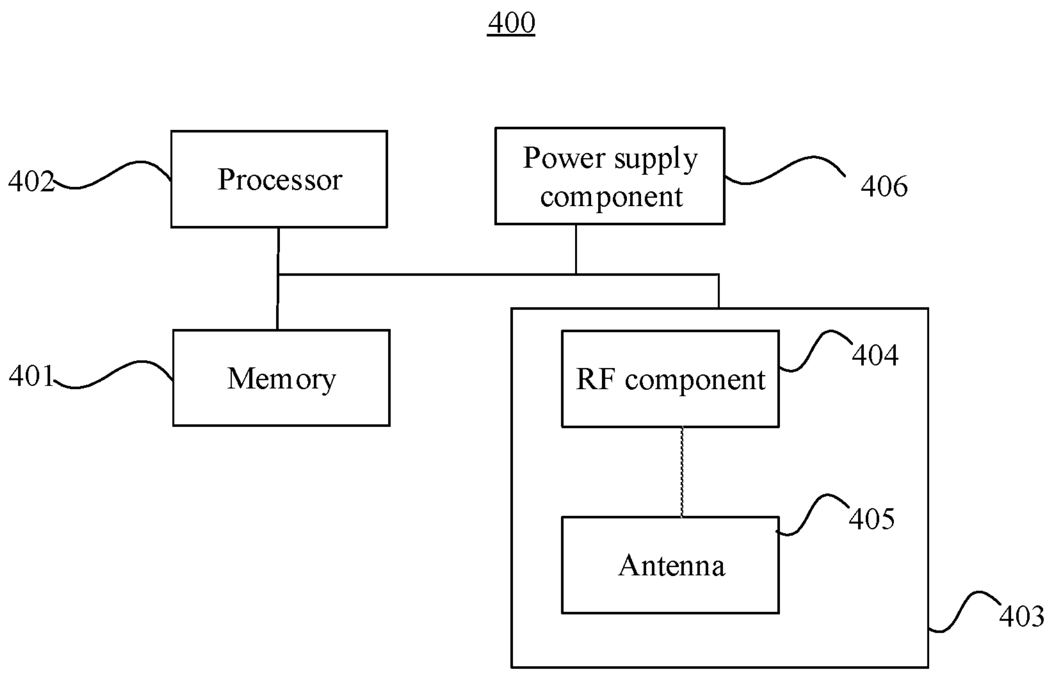
FIG. 4 is a structural diagram of a device for monitoring a physical downlink control channel according to an embodiment of the present disclosure.

When the communication device is the network device 102, the structure thereof may also be shown in FIG. 4. The structure of the communication device is illustrated using a base station as an example. As shown in FIG. 4, the device 400 includes a memory 401, a processor 402, a transceiving component 403, and a power supply component 406. The memory 401 is coupled to the processor 402 and may be used to store programs and data necessary for the communication device 400 to implement various functions. The processor 402 is configured to support the communication device 400 to perform the corresponding functions in the method described above, and the functions may be realized by calling programs stored in the memory 401. The transceiving component 403 may be a wireless transceiver that may be used to support the communication device 400 to receive signal and/or data and send signal and/or data via a wireless radio. The transceiving component 403 may also be referred to as a transceiving unit or a communication unit. The transceiving component 403 may include a radio frequency (RF) component 404 and one or more antennas 405. The RF component 404 may be a remote radio unit (RRU), which may be specifically used for the transmission of RF signals and the conversion between RF signals and baseband signals. The one or more antennas 405 may be used specifically for radiation and reception of RF signals.

When the communication device 400 needs to send data, the processor 402 may perform baseband processing on the data to be sent and then output a baseband signal to a RF unit. The RF unit performs RF processing on the baseband signal, and then transmits a RF signal in the form of electromagnetic waves through the antenna. When there is data sent to the communication device 400, the RF unit receives the RF signal through the antenna, converts the RF signal into a baseband signal, and outputs the baseband signal to the processor 402, which converts the baseband signal into data and processes the data.

Based on the same concept as the above method embodiments, an embodiment of the present disclosure also provides a communication device that may have the function of the user equipment 101 in the above method embodiments and may be used to perform the steps provided by the above method embodiments to be performed by the user equipment 101. The function may be implemented by a hardware, or by a software or by a hardware executing a corresponding software. The hardware or software includes one or more modules corresponding to the function described above.

Figure 5:
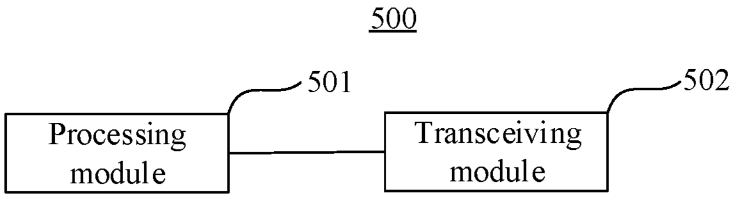
FIG. 5 is a structural diagram of a device for sending a physical downlink control channel according to an embodiment of the present disclosure.

In a possible implementation, the communication device 500 as shown in FIG. 5 may be used as the user equipment 101 involved in the above method embodiments and perform the steps performed by the user equipment 101 in the above method embodiments. As shown in FIG. 5, the communication device 500 may include a processing module 501 and a transceiving module 502 which are coupled to each other. The transceiving module 502 may be used to support the communication of the communication device 500, and the transceiving module 502 may have a wireless communication function, for example, can communicate wirelessly with other communication devices via wireless radio.

When performing the steps implemented by the user equipment 101, the processing module 501 is configured to determine that a PDCCH monitoring capability for use in a connection state is a multi-slot group PDCCH monitoring capability, and to monitor PDCCH using the multi-slot group PDCCH monitoring capability when the user equipment is in the connection state; and the transceiving module 502 is configured to receive the PDCCH.

Figure 6:
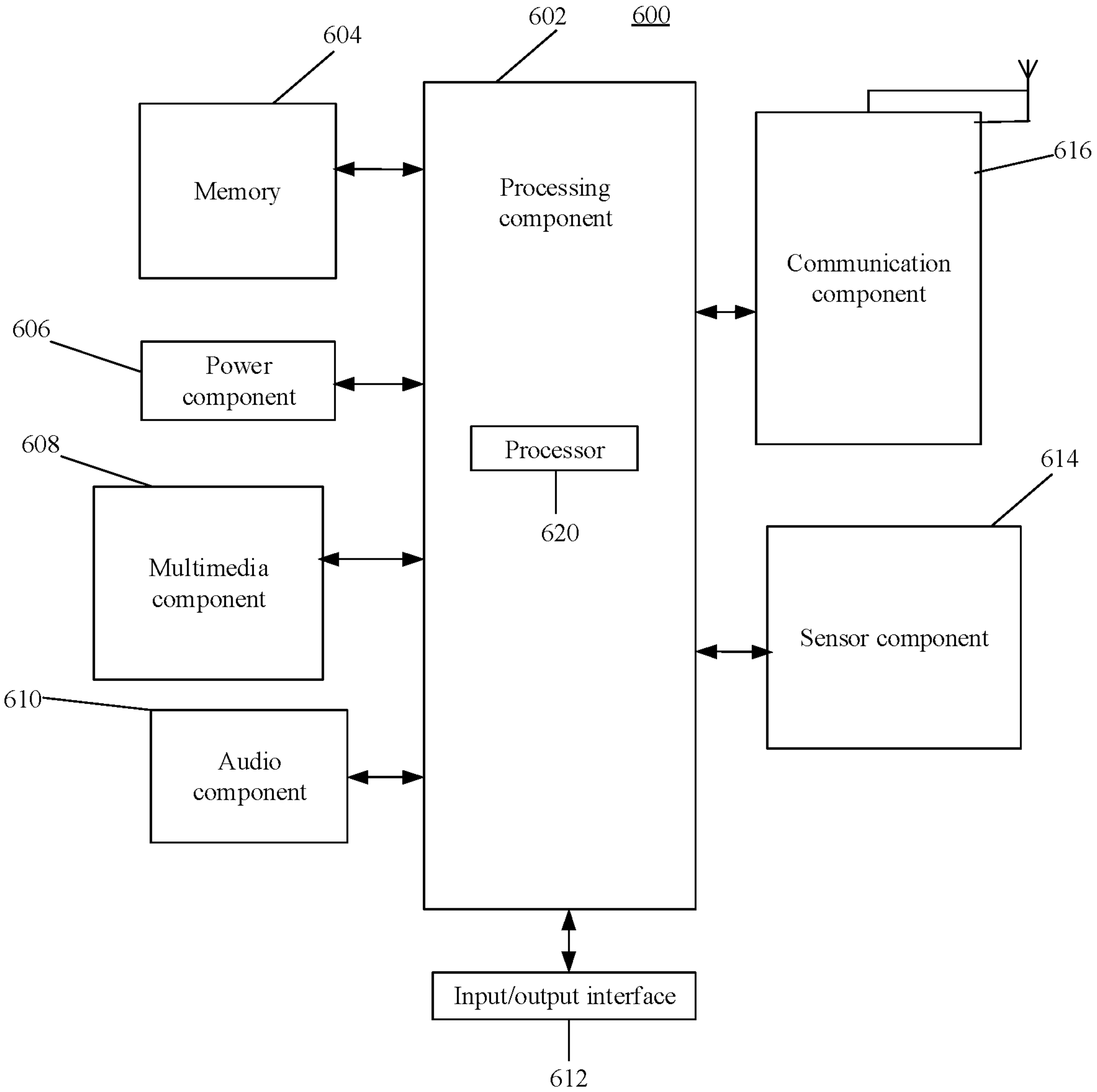
FIG. 6 is a structural diagram of a device for sending a physical downlink control channel according to an embodiment of the present disclosure.

When the communication device is the user equipment 101, the structure thereof may also be as shown in FIG. 6. The device 600 may be a mobile phone, a computer, a digital broadcast terminal, a message transceiver device, a game console, a tablet device, a medical device, a fitness device, a personal digital assistant, and the like.

Referring to FIG. 6, the device 600 may include one or more of a processing component 602, a memory 604, a power component 606, a multimedia component 608, an audio component 610, an input/output (I/O) interface 612, a sensor component 614, and a communication component 616.

The processing component 602 generally controls the overall operations of the device 600, such as operations associated with display, telephone calls, data communications, camera operations, and recording operations. The processing component 602 may include one or more processors 620 to execute instructions to complete all or part of the steps of the foregoing method. In addition, the processing component 602 may include one or more modules to facilitate interaction between the processing component 602 and other components. For example, the processing component 602 may include a multimedia module to facilitate the interaction between the multimedia component 608 and the processing component 602.

The memory 604 is configured to store various types of data to support the operation at the device 600. Examples of these data include instructions for any application or method operating on the device 600, contact data, phone book data, messages, pictures, videos and the like. The memory 604 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 606 provides power to various components of the device 600. The power component 606 may include a power management system, one or more power supplies, and other components associated with generating, managing, and distributing power for the device 600.

The multimedia component 608 includes a screen that provides an output interface between the device 600 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 608 includes a front camera and/or a rear camera. When the device 600 is in an operation mode, such as a shooting mode or a video mode, the front camera and/or the rear camera can receive external multimedia data. Each of the front camera and rear camera may be a fixed optical lens system or have focal length and optical zoom capabilities.

The audio component 610 is configured to output and/or input audio signals. For example, the audio component 610 includes a microphone (MIC), and when the device 600 is in an operation mode, such as a call mode, a recording mode, and a voice recognition mode, the microphone is configured to receive an external audio signal. The received audio signal can be further stored in the memory 604 or sent via the communication component 616. In some embodiments, the audio component 610 further includes a speaker for outputting audio signals.

The I/O interface 612 provides an interface between the processing component 602 and a peripheral interface module. The above-mentioned peripheral interface module may be a keyboard, a click wheel, a button, and the like. These buttons may include but are not limited to home button, volume button, start button, and lock button.

The sensor component 614 includes one or more sensors for providing the device 600 with various aspects of state evaluation. For example, the sensor component 614 can detect the on/off status of the device 600 and the relative positioning of components. For example, the component is a display and keypad of the device 600. The sensor component 614 can also detect the position change of the device 600 or a component of the device 600, the presence or absence of contact between the user and the device 600, the orientation or acceleration/deceleration of the device 600, and the temperature change of the device 600. The sensor component 614 may include a proximity sensor configured to detect the presence of nearby objects when there is no physical contact. The sensor component 614 may also include a light sensor, such as a CMOS or CCD image sensor, for use in imaging applications. In some embodiments, the sensor component 614 may also include an acceleration sensor, a gyroscope sensor, a magnetic sensor, a pressure sensor, or a temperature sensor.

The communication component 616 is configured to facilitate wired or wireless communication between the device 600 and other devices. The device 600 can access a wireless network based on a communication standard, such as WiFi, 4G, or 5G, or a combination thereof. In an embodiment, the communication component 616 receives a broadcast signal or broadcast related information from an external broadcast management system via a broadcast channel. In an embodiment, the communication component 616 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the device 600 may be implemented by one or more of application specific integrated circuit (ASIC), digital signal processor (DSP), digital signal processing device (DSPD), programmable logic devices (PLD), field programmable gate array (FPGA), controller, microcontroller, microprocessor, or other electronic components, to perform the above-mentioned methods.

An embodiment also provides a non-transitory computer-readable storage medium including instructions, such as the memory 604 including instructions, and the instructions may be executed by the processor 620 of the device 600 to complete the foregoing method. For example, the non-transitory computer-readable storage medium may be ROM, random access memory (RAM), CD-ROM, magnetic tape, floppy disk, optical data storage device and the like.

In a possible implementation, the method for monitoring a PDCCH further includes:

monitoring, in response to determining that the user equipment is in a non-connection state, the PDCCH using a single slot PDCCH monitoring capability.

In a possible implementation, determining that the PDCCH monitoring capability for use in the connection state is the multi-slot group PDCCH monitoring capability includes:

determining, according to a protocol, that the PDCCH monitoring capability for use in the connection state is the multi-slot group PDCCH monitoring capability.

In a possible implementation, determining that the PDCCH monitoring capability for use in the connection state is the multi-slot group PDCCH monitoring capability includes:

receiving PDCCH monitoring capability configuration information from a network device, wherein the PDCCH monitoring capability configuration information is configured to indicate that the PDCCH monitoring capability for use in the connection state is the multi-slot group PDCCH monitoring capability.

In a possible implementation, determining that the PDCCH monitoring capability for use in the connection state is the multi-slot group PDCCH monitoring capability includes:

sending capability information to a network device, wherein the capability information includes the multi-slot group PDCCH monitoring capability.

In a possible implementation, the method for monitoring a PDCCH further includes:

sending at least one group of capability parameters corresponding to the multi-slot group PDCCH monitoring capability to a network device.

In a possible implementation, the method for monitoring a PDCCH further includes:

receiving PDCCH monitoring capability configuration information from a network device, wherein the PDCCH monitoring capability configuration information is configured to indicate that the PDCCH monitoring capability for use in the connection state is the multi-slot group PDCCH monitoring capability, and is further configured to indicate a target group of capability parameters, and wherein the target group of capability parameters is a group among the at least one group of capability parameters.

In a possible implementation, slots for monitoring the PDCCH corresponding to the target group of capability parameters meet a first condition, and wherein the first condition includes that a common search space configured within a same multi-slot group and a common search space received by the user equipment in a non-connection state are located in some or all of the slots for monitoring the PDCCH corresponding to the target group of capability parameters of the user equipment.

In a possible implementation, each of the at least one group of capability parameters includes a first value and a second value.

In a possible implementation, the first value is configured to indicate a number of slots included in each multi-slot group, and the second value is configured to indicate a number of slots for monitoring the PDCCH included in each multi-slot group, wherein respective multi-slot groups are consecutive and do not have an overlapping slot, and positions of slots for monitoring the PDCCH in any two different multi-slot groups are the same.

In a possible implementation, the first value is configured to indicate a minimum value of a number of slots between two neighbouring multi-slot groups, and the second value is configured to indicate a number of slots for monitoring the PDCCH included in each multi-slot group.

In an implementation, the method for sending a PDCCH further includes:

receiving capability information from the user equipment, wherein the capability information includes the multi-slot group PDCCH monitoring capability.

In an implementation, at least one group of capability parameters corresponding to the multi-slot group PDCCH monitoring capability is received from the user equipment.

In an implementation, the method further includes:

sending PDCCH monitoring capability configuration information to the user equipment, wherein the PDCCH monitoring capability configuration information is configured to indicate that the PDCCH monitoring capability for use in the connection state is the multi-slot group PDCCH monitoring capability, and is further configured to indicate a target group of capability parameters, and wherein the target group of capability parameters is a group among the at least one group of capability parameters.

In an implementation, slots for monitoring the PDCCH corresponding to the target group of capability parameters meet a first condition, and wherein the first condition includes that a common search space configured within a same multi-slot group and a common search space received by the user equipment in a non-connection state are located in some or all of the slots for monitoring the PDCCH corresponding to the target group of capability parameters of the user equipment.

The present disclosure is intended to cover any variations, uses, or adaptations of the present disclosure that follow the general principles of the present disclosure and include the common knowledge or conventional technical means in the technical field not disclosed by the present disclosure. The specification and embodiments are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

PRACTICAL APPLICABILITY

After determining that the PDCCH monitoring capability for use in the connection state is the multi-slot group PDCCH monitoring capability, the user equipment monitors the PDCCH in the connection state using the multi-slot group PDCCH monitoring capability, and monitors the PDCCH in the non-connection state using the single slot PDCCH monitoring capability, therefore the PDCCH is monitored in different RRC states using respective monitoring capabilities, which can effectively save the processing capability of the user equipment, and at the same time can guarantee the effect of the PDCCH monitoring.

What is claimed is:

1. A method for monitoring a physical downlink control channel (PDCCH), comprising:

determining, by a user equipment, that a PDCCH monitoring capability for use in an RRC connection state is a multi-slot group PDCCH monitoring capability;

in response to determining that the user equipment is in the RRC connection state, monitoring, by the user equipment, the PDCCH using the multi-slot group PDCCH monitoring capability, sending, by the user equipment, at least one group of capability parameters corresponding to the multi-slot group PDCCH monitoring capability to a network device; and receiving, by the user equipment, PDCCH monitoring capability configuration information from the network device, wherein the PDCCH monitoring capability configuration information is configured to indicate that the PDCCH monitoring capability for use in the RRC connection state is the multi-slot group PDCCH monitoring capability, and is further configured to indicate a target group of capability parameters, wherein the target group of capability parameters is a group among the at least one group of capability parameters, wherein slots for monitoring the PDCCH corresponding to the target group of capability parameters meet a first condition, and wherein the first condition comprises that a common search space configured within a same multi-slot group and a common search space received by the user equipment in a non-connection state are located in some or all of the slots for monitoring the PDCCH corresponding to the target group of capability parameters of the user equipment.

2. The method according to claim 1, further comprising:

in response to determining that the user equipment is in a non-connection state, monitoring, by the user equipment, the PDCCH using a single slot PDCCH monitoring capability.

3. The method according to claim 1, wherein determining that the PDCCH monitoring capability for use in the RRC connection state is the multi-slot group PDCCH monitoring capability comprises:

determining, according to a protocol, that the PDCCH monitoring capability for use in the RRC connection state is the multi-slot group PDCCH monitoring capability.

4. The method according to claim 1, wherein determining that the PDCCH monitoring capability for use in the RRC connection state is the multi-slot group PDCCH monitoring capability comprises:

sending capability information to a network device, wherein the capability information comprises the multi-slot group PDCCH monitoring capability.

5. The method according to claim 1, wherein each of the at least one group of capability parameters comprises a first value and a second value.

6. The method according to claim 5, wherein the first value is configured to indicate a number of slots comprised in each multi-slot group, and the second value is configured to indicate a number of slots for monitoring the PDCCH comprised in each multi-slot group, and wherein respective multi-slot groups are consecutive and do not have an overlapping slot, and positions of slots for monitoring the PDCCH in any two different multi-slot groups are the same.

7. The method according to claim 5, wherein the first value is configured to indicate a minimum value of a number of slots between two neighbouring multi-slot groups, and the second value is configured to indicate a number of slots for monitoring the PDCCH comprised in each multi-slot group.

8. A method for sending a physical downlink control channel (PDCCH), comprising:

sending, by a network device, PDCCH monitoring capability configuration information to a user equipment, wherein the PDCCH monitoring capability configuration information is configured to indicate that a PDCCH monitoring capability for use in an RRC connection state is a multi-slot group PDCCH monitoring capability;

receiving, by the network device, at least one group of capability parameters corresponding to the multi-slot group PDCCH monitoring capability from the user equipment; and sending, by the network device, PDCCH monitoring capability configuration information to the user equipment, wherein the PDCCH monitoring capability configuration information is configured to indicate that the PDCCH monitoring capability for use in the RRC connection state is the multi-slot group PDCCH monitoring capability, and is further configured to indicate a target group of capability parameters, wherein the target group of capability parameters is a group among the at least one group of capability parameters, wherein slots for monitoring the PDCCH corresponding to the target group of capability parameters meet a first condition, and wherein the first condition comprises that a common search space configured within a same multi-slot group and a common search space received by the user equipment in a non-connection state are located in some or all of the slots for monitoring the PDCCH corresponding to the target group of capability parameters of the user equipment.

9. The method according to claim 8, further comprising:

receiving, by the network device, capability information from the user equipment, wherein the capability information comprises the multi-slot group PDCCH monitoring capability.

10. The method according to claim 8, wherein each of the at least one group of capability parameters comprises a first value and a second value.

11. The method according to claim 10, wherein the first value is configured to indicate a number of slots comprised in each multi-slot group, and the second value is configured to indicate a number of slots for monitoring the PDCCH comprised in each multi-slot group, and wherein respective multi-slot groups are consecutive and do not have an overlapping slot, and positions of slots for monitoring the PDCCH in any two different multi-slot groups are the same.

12. The method according to claim 10, wherein the first value is configured to indicate a minimum value of a number of slots between two neighboring multi-slot groups, and the second value is configured to indicate a number of slots for monitoring the PDCCH comprised in each multi-slot group.

13. A device for monitoring a physical downlink control channel (PDCCH), applied to a user equipment and comprising:

a processor; and a memory for storing executable instructions of the processor that, when being executed by the processor, cause the user equipment to implement:

determining that a PDCCH monitoring capability for use in an RRC connection state is a multi-slot group PDCCH monitoring capability;

in response to determining that the user equipment is in the RRC connection state, monitoring the PDCCH using the multi-slot group PDCCH monitoring capability, sending at least one group of capability parameters corresponding to the multi-slot group PDCCH monitoring capability to a network device; and receiving PDCCH monitoring capability configuration information from the network device, wherein the PDCCH monitoring capability configuration information is configured to indicate that the PDCCH monitoring capability for use in the RRC connection state is the multi-slot group PDCCH monitoring capability, and is further configured to indicate a target group of capability parameters, wherein the target group of capability parameters is a group among the at least one group of capability parameters, wherein slots for monitoring the PDCCH corresponding to the target group of capability parameters meet a first condition, and wherein the first condition comprises that a common search space configured within a same multi-slot group and a common search space received by the user equipment in a non-connection state are located in some or all of the slots for monitoring the PDCCH corresponding to the target group of capability parameters of the user equipment.

14. The device according to claim 13, wherein the user equipment is caused to further implement:

in response to determining that the user equipment is in a non-connection state, monitoring the PDCCH using a single slot PDCCH monitoring capability.

15. The device according to claim 13, wherein determining that the PDCCH monitoring capability for use in the RRC connection state is the multi-slot group PDCCH monitoring capability comprises:

determining, according to a protocol, that the PDCCH monitoring capability for use in the RRC connection state is the multi-slot group PDCCH monitoring capability.

16. The device according to claim 13, wherein each of the at least one group of capability parameters comprises a first value and a second value.

17. The device according to claim 16, wherein the first value is configured to indicate a number of slots comprised in each multi-slot group, and the second value is configured to indicate a number of slots for monitoring the PDCCH comprised in each multi-slot group, and wherein respective multi-slot groups are consecutive and do not have an overlapping slot, and positions of slots for monitoring the PDCCH in any two different multi-slot groups are the same.

18. The device according to claim 16, wherein the first value is configured to indicate a minimum value of a number of slots between two neighboring multi-slot groups, and the second value is configured to indicate a number of slots for monitoring the PDCCH comprised in each multi-slot group.

* * * * *